United States Patent [19]
Kaufman

[11] 3,733,590
[45] May 15, 1973

[54] OPTIMUM ELECTRODE CONFIGURATION CERAMIC MEMORIES WITH CERAMIC MOTOR ELEMENT AND MECHANICAL DAMPING

[76] Inventor: Alvin B. Kaufman, 22420 Philiprimm Street, Woodland Hills, Calif. 91364

[22] Filed: Apr. 15, 1971

[21] Appl. No.: 134,212

[52] U.S. Cl. .................340/173.2, 310/9.1, 310/9.7
[51] Int. Cl. ...................G11c 11/22, H04r 17/00
[58] Field of Search ............340/173.2; 310/9.1, 310/9.7

[56] References Cited

UNITED STATES PATENTS

| 3,496,553 | 2/1970 | Freytag | 340/173.2 |
| 3,462,746 | 8/1969 | Bartlett | 340/173.2 |
| 3,535,686 | 10/1970 | Barnett | 340/173.2 |
| 2,782,397 | 2/1957 | Young | 340/173.2 |

Primary Examiner—Bernard Konick
Assistant Examiner—Stuart Hecker
Attorney—Flam & Flam

[57] ABSTRACT

Ceramic memories utilize an electrostrictive ceramic motor element mechanically bonded to a ferroelectric ceramic memory element. Signal or "bit" electrodes are disposed over only the portion of the memory element to which maximum stress is transmitted by the motor element. In disc shaped embodiments, the bit electrodes are restricted to the central 50 percent of the memory device surface; in rectangular embodiments, the bit electrodes are disposed along the longitudinal centerline of the memory element and have a width less than one-half that of the memory device. In other embodiments, a portion of the memory element ceramic slab performs a motor function, or alternatively, dual motor elements are employed. To prevent ringing, each memory device may employ a damping electrode fabricated of an electrically conductive alloy exhibiting mechanical damping capacity. Alternatively, the device may be mounted to a substrate by means of an energy absorbing material, or may have an edge mechanically clamped or adhesively bonded to the substrate to prevent ringing.

26 Claims, 13 Drawing Figures

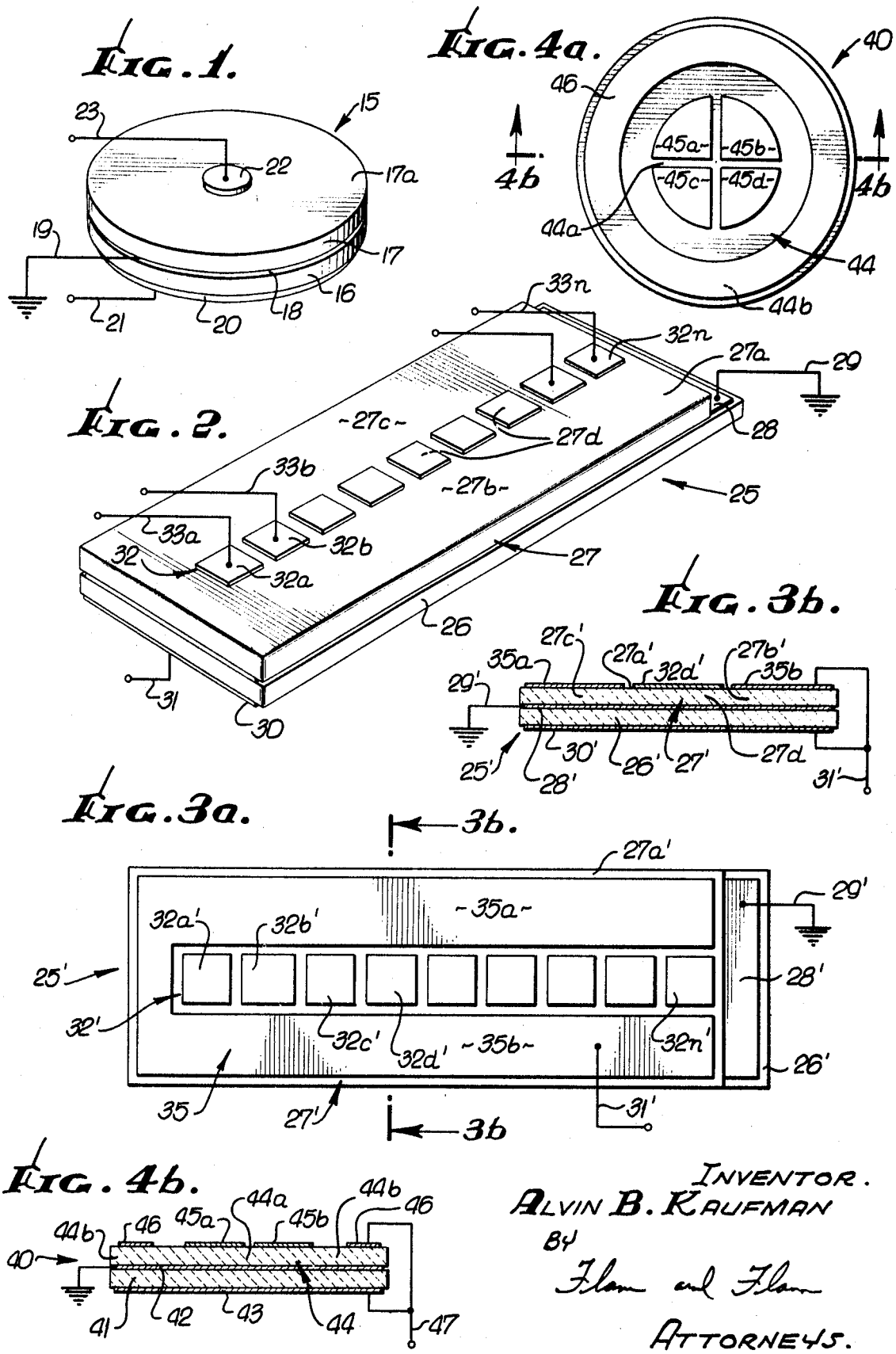

Patented May 15, 1973
3,733,590
2 Sheets-Sheet 2
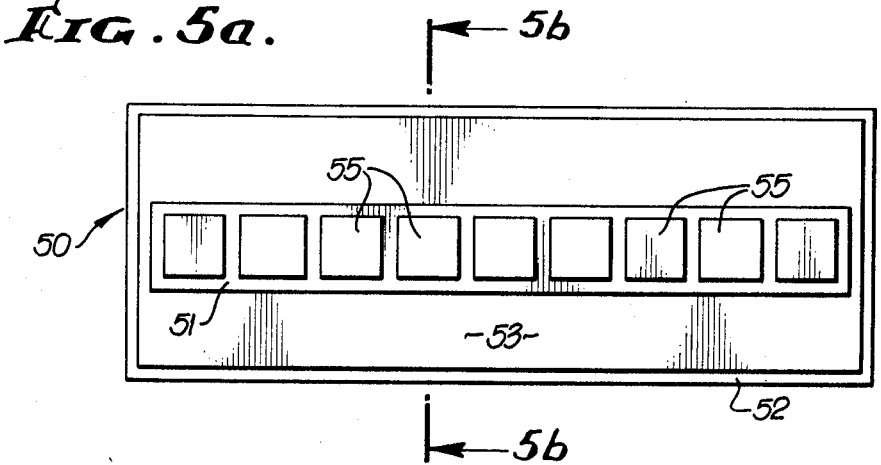
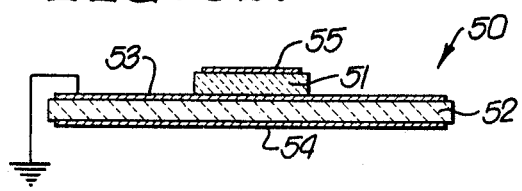
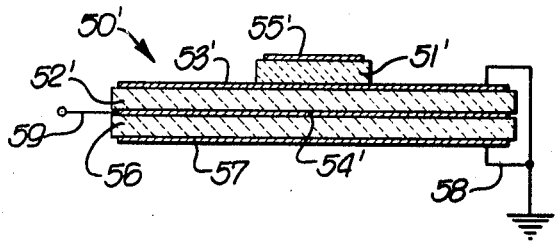
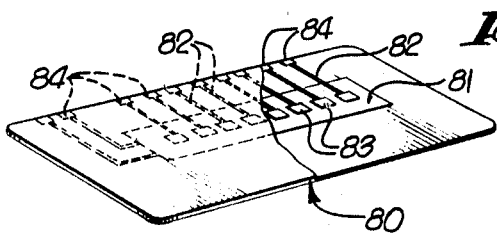
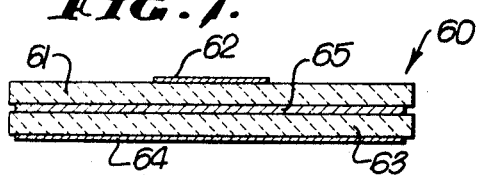
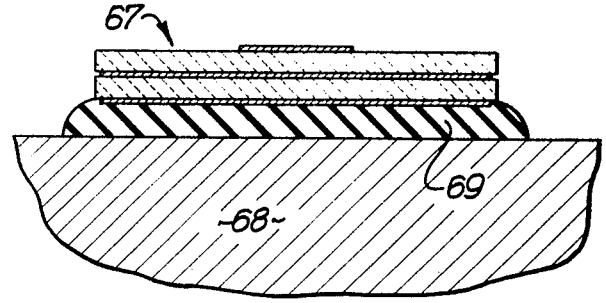
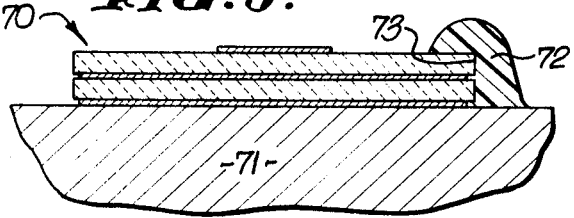
INVENTOR.
ALVIN B. KAUFMAN
BY
Flam and Flam
ATTORNEYS.

OPTIMUM ELECTRODE CONFIGURATION CERAMIC MEMORIES WITH CERAMIC MOTOR ELEMENT AND MECHANICAL DAMPING

BACKGROUND OF THE INVENTION

1. Field of the Invention

The present invention relates to ceramic memory elements, and more particularly to optimum configuration ceramic memories providing nondestructive readout at relatively high output signal levels, without the need for encapsulation or resonant operation.

2. Description of the Prior Art

Considerable need has evolved in recent years for a relatively inexpensive memory element which exhibits nondestructive readout; which provides an output signal level sufficient to drive transistor circuitry directly, without the need for amplification; and which is not affected adversely by stray magnetic fields. Such a memory element would have widespread applicability in computer and related digital equipments. Moreover, such a device would be well adapted for use in a credit card of the type wherein credit status and customer identification is stored in a passive memory element embedded in the card.

The ceramic memory holds promise of providing the desired characteristics, however, previously known ceramic memory elements have exhibited various shortcomings. Consider, for example, a typical prior art ceramic "bender" memory device using separate but physically interconnected motor and memory elements. The motor element is fabricated from a slab of ceramic having good electrostrictive properties, and which is permanently polarized to one or the other of its bipolar levels. The memory element is fabricated from a slab of ceramic having good ferroelectric properties, and which is free to assume either one of its bipolar levels.

To store data, an electric field is applied to the memory element of sufficient magnitude to polarize the ferroelectric material. The direction of the applied field establishes which of the two polarization states, representing respectively a binary 1 and a binary 0, is assumed by the memory element. When an electric field is applied across the motor element, the electrostrictive effect causes physical deformation of that element. This physical deformation is transmitted to the memory element to produce a mechanical stress or deformation therein. Through operation of the ferroelectric effect, an output electrical potential is produced by the memory element. The polarity of this output voltage is representative of the binary datum stored in the bipolar memory element.

Despite the use of ceramic materials chosen to exhibit optimum electrostrictive and ferroelectric effects, the maximum readout voltage obtainable from such prior art unencapsulated "bender" memory elements typically is only between about 5 and 75 millivolts, when the memory is asynchronously interrogated. Such relatively low output voltage generally requires amplification prior to utilization by computer or other circuitry.

The relatively low output voltage in part results since some regions of the memory element are stressed less than others. The lower stressed regions are mechanically diverting and reduce the stress, and hence output voltage, in those areas which are strained most greatly. As a result, such lower stressed regions of the memory element act as a "sink," reducing the net output signal level from the device.

Ideally, prior art "bender" memory devices should exhibit a theoretical maximum output-to-interrogate voltage ratio or efficiency of about 9 percent. In other words, an interrogate pulse of 20 volts in theory could provide an output signal of 1.8 volts. However, in actual prior art "bender" memory elements, an efficiency of only 4 percent to 5 percent is achieved. Thus, with an interrogate pulse of 20 volts, an output of less than 1 volt generally is obtained.

A number of approaches have been suggested in the past to provide ceramic memories with higher readout levels. Thus, in the U. S. Pat. No. 3,142,044 to Kaufman et al., a ceramic memory device is disclosed which uses a monomorphic element. A first portion of the single element is polarized permanently in one state of polarization, and functions as the motor. When an electric field is applied this motor portion, the electrostrictive effect causes a physical deformation which is transmitted through the single element to the memory portion. The memory portion, which previously has been polarized to one or the other of its polarization states, produces in response to the transmitted deformation an output voltage having a polarity indicative of the stored information.

While such a monomorphic ceramic memory can provide a relatively high output voltage level, it has the disadvantage that the motor portion must be excited by a sinusoidal signal or a pulse train at or near the resonant frequency of the element to obtain this high signal level. Accordingly, the memory element does not lend itself to operation with a single interrogate or "read" pulse, as usually is provided in computer systems. Considerable extra circuitry is required to provide the resonant excitation signal necessary to utilize the memory element. Further, if multiple data bits are stored in adjacent portions of the same memory element, it is difficult to read out the bits simultaneously, because of the propagation time associated with transmitting the motor element deformation along the length of the monomorphic element.

A more acceptable approach is set forth in the inventor's U.S. Pat. No. 3,543,258 entitled "Encapsulated Ceramic Memory." In this device, separate ceramic motor and memory elements are employed, the entire memory being encapsulated in an epoxy resin or like material which functions to clamp the device so as to minimize ringing, reduce the "sink" effect, and optimize effective stressing of the memory element. As a result, relatively high output voltage is achieved which may be used directly by transistor circuitry. On the other hand, utilization of an encapsulant material severely restricts the physical configuration, and adds to the size, cost and fabrication complexity of the memory device.

Other problems associated with bender memories are discussed in the inventor's article entitled "Effect of Clamping and Damping on Piezoelectric Bender Elements" published in the Journal of the Acoustical Society of America, Volume 48, Number 2 (Part 1), 1970, at page 421.

These and other shortcomings of the prior art are overcome by the optimum configuration ceramic memories disclosed herein. These devices exhibit nondestructive readout; provide relatively high output voltages capable of driving transistor circuits directly; and facilitate simultaneous readout of multibit stored data.

SUMMARY OF THE INVENTION

In accordance with the present invention, there are provided optimum configuration ceramic memories of the type having nondestructive readout, and providing output signals of sufficient voltage to drive bipolar, field effect or metal oxide semiconductor (MOS) transistors directly, without amplification. The memories are characterized by employing an electrostrictive ceramic motor element mechanically bonded to a ferroelectric memory element. The storage portion of the memory element is significantly smaller in physical extent than the motor element, to insure optimal stressing by the motor element, and to minimize any "sink" effect in the memory element. Appropriate damping or clamping may be provided to prevent ringing of the ceramic memory devices.

In certain embodiments of the invention, the memory element slab is approximately equal in size to the motor element, but the signal or "bit" electrodes are disposed only atop the central portion of the memory element slab. In a disc shaped memory, the bit electrodes preferably are restricted to the central 50 percent of the area of the memory device. In a multibit embodiment of generally rectangular configuration, plural signal electrodes are disposed along the longitudinal centerline of the memory element slab, each electrode having a width less than one-half the overall width of the memory device. In these embodiments, "cupping" of the memory element slab produces maximum stress in the data storage areas under the bit electrodes.

In other embodiments, a portion of the memory element slab performs a motor function enhancing the stress produced by the separate motor element. A ceramic memory employing a dual motor element also is disclosed.

To prevent ringing of the memory devices, the electrode sandwiched between the motor element and memory element may comprise an electrically conductive alloy exhibiting a good mechanical damping capability. Alternatively, the memory device may be mounted to a rigid substrate by means of an energy absorbing synthetic rubber compound. In other embodiments, an edge of the memory device may be clamped to a rigid substrate using either an epoxy resin bead or a mechanical clamp.

Thus it is an object of the present invention to provide ceramic memories having separate motor and memory elements, and configured to produce optimum stress in the memory element storage regions, thereby providing output electrical signals capable of driving transistor circuitry without the need for amplification.

BRIEF DESCRIPTION OF THE DRAWINGS

A detailed description of the invention will be made with a reference to the accompanying drawings wherein the ceramic memory devices are shown greatly enlarged from actual size. These drawings are not to scale, rather, the thickness of each illustrated device has been exaggerated for clarity of exposition.

FIG. 1 is a perspective view of a disc shaped ceramic memory in accordance with the present invention.

FIG. 2 is a perspective view of a multibit ceramic memory device of generally rectangular configuration.

FIG. 3a is a top plan view, and FIG. 3b is a transverse sectional view of another multibit ceramic memory device in which a portion of the memory element slab also performs a motor function.

FIG. 4a is a top plan view, and FIG. 4b is a transverse sectional view of a four bit, disc shaped memory element also using a portion of the memory element slab to perform a motor function.

FIG. 5a is a top plan view, and FIG. 5b is a transverse sectional view of an alternative multibit ceramic memory device of generally rectangular configuration.

FIG. 6 is a transverse sectional view of another ceramic memory element employing two motor elements; the device of FIG. 6 may be disc shaped, or alternatively, may be generally rectangular and have a top plan view like that of FIG. 5a.

FIG. 7 is a transverse sectional view of a ceramic memory device configured similar to that shown in FIGS. 3a and 3b, but having a center electrode which also functions to provide mechanical damping.

FIG. 8 is a transverse sectional view of a ceramic memory device such as that shown in FIGS. 3a and 3b, but mounted to a rigid substrate by means of a synthetic, non-metallic damping agent.

FIG. 9 is a transverse sectional view of a ceramic memory device such as that shown in FIG. 3a, but clamped along one edge to a substrate.

FIG. 10 is a perspective view of a credit, identification or security key card incorporating a ceramic memory in accordance with the present invention.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention, since the scope of the invention best is defined by the appended claims.

Structural and operational characteristics attributed to forms of the invention first described also shall be attributed to forms later described, unless such characteristics obviously are inapplicable or unless specific exception is made.

Referring now to the drawings, and particularly to FIG. 1 thereof, there is shown a one bit, disc shaped ceramic memory 15 in accordance with the present invention. The memory 15 comprises a lower ceramic disc 16 of electrostrictive material which functions as the motor element, and an upper ceramic disc 17 of ferroelectric material which functions as the memory element. The ceramic discs 16, 17 are mechanically bonded together with an intermediate conductive electrode 18 which typically is connected to ground via an electrical conductor 19 so as to form the ground vane for the memory 15. A bottom conductive electrode 20 receives the memory interrogate or clock pulse via a conductor 21. The motor element 16 may or may not be permanently poled depending upon the specific application.

An electrically conductive "bit" electrode 22 is disposed on the upper surface 17a of the memory element 17, adjacent the center thereof, and is provided with an electrical conductor 23. Although the general structure of the memory device 15 is similar to that of a conventional disc bender memory, the significant improvement resides in limiting the area of the electrode 22 to cover less than about 50 percent of the area of the memory element upper surface 17a.

When an interrogate or clock signal is applied between lines 21 and 19, the resultant electric field produced within the lower ceramic disc 16 between the electrodes 20 and 18 electrostrictively stresses that motor element. The resultant deformation of the motor element 16 is transmitted mechanically to the upper ceramic disc 17; stressing that memory element so as to produce, through operation of the ferroelectric effect, an electrical potential between the electrodes 18 and 22. As discussed below, the polarity of the resultant output signal on the line 23 is indicative of whether a binary 1 or 0 is stored in the memory device 15.

By situating electrode 22 adjacent the center of the memory element 17, and limiting the area of the electrode 22 to less than about 50 percent of the area of the ceramic disc surface 17a, greatest electrical output from the memory device 15 is achieved. In part, this results since the memory element 17 is "cupped" by the motor element 16, producing maximum strain near the center of the memory element. The annular area of the ceramic disc 17 radially outward of the electrode 22 typically is stressed less than the central region, and thus represents an area which is mechanically diverting. Since the electrode 22 does not cover this "sink" area, an output signal of significantly higher amplitude is achieved as compared with prior art disc bender memories. Note that the output signal level further may be enhanced by employing one of the damping or clamping techniques described hereinbelow in conjunction with FIGS. 7, 8 and 9.

The memory element 17 preferably is fabricated of a ferroelectric material which is capable of being polarized in one of two polarities. To enter data into the memory device 15, an electrical potential is applied between the electrodes 18 and 22 of sufficient voltage so that the resultant electric field will polarize the memory element region beneath the bit electrode 22 to one of the two ferroelectric polarization states. The polarity of the applied voltage will determine the state of polarization within the memory element 17, and thus will establish whether a binary 0 or 1 is stored. The ferroelectric material of the memory element 17 remains polarized in the selected state after termination of the data entry signal.

As noted above, when the memory element 17 subsequently is stressed by action of the motor element 16, the ferroelectric effect produces an output electrical potential between the lines 23 and 19, the polarity of which depends on the residual polarization, and hence is indicative of the datum stored by the memory element 17. The readout is nondestructive; that is, the memory element 17 remains poled in the selected state even after the memory device 15 has been interrogated. The memory element 17 will remain so poled until a subsequent data entry signal is applied.

Because of the improved geometry of the disc memory 15, the output signal obtained typically is on the order of 2 or more volts, sufficiently great to drive bipolar or MOS transistors directly, without the need for amplification. Further, the bit-to-interrogate voltage ratio or efficiency achieved by the memory device 15 is very close to the theoretical maximum.

Referring now to FIG. 2, there is shown a generally rectangular ceramic memory device 25 which is operatively similar to the device 15 described above, but which is capable of storing multiple bits of information. The memory device 25 includes a motor element 26 of electrostrictive ceramic material, mechanically bonded to a memory element 27 of ferroelectric material. An electrode 28 intermediate elements 26 and 27 is connected to ground via a conductor 29, and a bottom electrode 30 receives an interrogate signal supplied via an electrical conductor 31. A plurality of bit electrodes 32a, 32b . . . 32n (herein collectively designated electrodes 32) are disposed in a row along the longitudinal center line of the upper surface 27a of the memory element 27.

Application of an interrogate signal between the electrodes 28 and 30 causes the motor element 26 to deform, transmitting a deformation or stress to the memory element 27. As a result of the ferroelectric effect, output signals are produced at each of the electrodes 32, which signals may be directed to external utilization circuitry via the respective conductors 33a, 33b . . . 33n. Each such output signal will have a polarity indicative of the state to which the region of the memory element 27 beneath the corresponding one of bit electrodes 32 previously has been polarized. Note that when a single interrogate pulse is applied via the line 31, essentially simultaneous readout is achieved from all of the plural bit electrodes 32. There is no propagation time delay, such as that associated with prior art monomorphic memory devices.

In accordance with the present invention, the width of each bit electrode 32 preferably is less than one-half of the overall width of the memory element 27. This insures that the bit electrodes 32 are situated along the area of maximum stress within the memory element 27, and do not extend over the longitudinal "sink" regions 27b, 27c between the centrally located memory region 27d and the longitudinal edges of the element 27. For optimum output levels, the ceramic memory 25 preferably also utilizes one of the damping or clamping techniques described hereinbelow in conjunction with FIGS. 7, 8 and 9.

By way of example only, the motor element 26 may have a thickness of less than about 20 mils, typically 5 mils, and a width of about 0.25 inches. The memory element 27 may be similarly dimensioned, and each of the bit electrodes 32 may have a width of about 0.08 inches. Preferably, the length of the device 25 should be at least twice the width of the device, so as to optimize the "cupping" produced by the motor element 26.

Referring now to FIGS. 3a and 3b, there is shown another embodiment of the invention wherein portions of the memory element slab are used to perform a motor function. Thus there is provided a memory device 25' having a motor element 26', a ceramic slab 27' functioning in part as a memory element, an intermediate electrode 28' connected to ground via a conductor 29', an interrogate electrode 30' and a plurality of bit electrodes 32' all substantially corresponding to the like numbered, but unprimed components of the ceramic memory 25. As in memory 25, the bit electrodes 32' are situated along the longitudinal centerline of the device 25', and the width of each bit electrode 32' preferably is less than one-half of the overall width of the memory element slab 27'.

To utilize a portion of the ceramic slab 27' to perform a motor function, a generally U-shaped electrode 35 is provided on the top surface 27a' of the slab 27'. The electrode 35 includes elongate leg portions 35a, 35b extending respectively between the row of bit electrodes 32' and the longitudinal edges of the ceramic slab 27'. The electrode 35 may be connected to the bottom electrode 30' (FIG. 3b) by means of an electrical conductor 31'.

When an interrogate signal is applied between the conductor 31' and ground, and electric field is produced between the electrodes 35 and 28' within the longitudinal regions 27b', 27c' of the ceramic slab 27'. In accordance with the present invention, these regions 27b', 27c' are appropriately permanently poled so that the resultant electrostrictive stress within the regions 27b', 27c' aids the stress produced within the motor element 26' in response to the electric field between the electrodes 30' and 28'. Accordingly, the regions 27b', 27c' also perform a motor function, enhancing the stress or deformation produced by the motor element 26'. The result is to create a greater strain within the memory element regions 27d' of the ceramic slab 27' beneath the bit electrodes 32', and hence to increase the signal level produced via these bit electrodes.

FIGS. 4a and 4b illustrate a disc shaped, four bit ceramic memory 40 which also utilizes a portion of the upper ceramic element to perform a motor function. As seen in the figures, the device 40 includes a lower ceramic disc 41 of electrostrictive material which functions as a motor element upon application of an electric field between an intermediate electrode 42 and a bottom electrode 43. An upper ceramic disc 44 includes a central circular region 44a exhibiting a ferroelectric effect, and serving as the memory element for the device 40, and an outer, annular region 44b exhibiting an electrostrictive effect and functioning as an additional motor element.

The memory element region 44a is divided into four sectors beneath four respective bit electrodes 45a, 45b, 45c, 45d. In accordance with the present invention, the total surface area covered by these four electrodes 45a through 45d preferably is less than about 50 percent of the total upper surface area of the device 40.

Further, the annular motor region 44b of the ceramic disc 44 is permanently polarized, and is provided with an annular electrode 46 which may be connected by means of an electrical conductor 47 to the bottom electrode 43. When an interrogate signal is applied to the device 40 via the conductor 47, the resultant stress produced in the annular region 44b adds to the stress produced by the motor element 41, so as to transmit maximum stress to the memory region 44a. As a result, the outputs from the device 40 are of optimum signal level. Again, the device 40 may utilize one of the damping or clamping techniques described below in conjunction with FIGS. 7, 8 and 9.

In each of the memory devices 15, 25, 25' and 40, a lower ceramic member is used as the motor element and only the central region of an upper ceramic member is used as the memory element. There is no requirement that the upper ceramic member be equal in width to the lower, motor element. Accordingly, FIGS. 5a and 5b illustrate a multibit ceramic memory 50 in which the memory element comprises an elongate strip 51 of ferroelectric ceramic material, the width of which preferably is less than about one-half the width of the ceramic motor element 52. As in the embodiment of FIG. 2, the motor element 52 is provided with a pair of electrodes 53, 54 across which a memory interrogate signal is applied. The memory element 51 is disposed atop the electrode 53 and mechanically bonded so as to be stressed by deformation of the motor element 52.

A plurality of bit electrodes 55 are disposed along the top surface of the memory element 51.

Note that by limiting the width of the memory element 51 to less than one-half the width of the motor element 52, there is essentially no region of the memory element to serve as a "sink." Thus optimum output voltages are obtained.

The ceramic memory 50 preferably also uses one of the damping or clamping techniques shown in FIGS. 7, 8 and 9 below. Note further that a disc shaped memory device (not shown) also could be fabricated wherein the diameter of the upper memory element is substantially smaller than the diameter of the lower motor element. Preferably, the area of such a memory element should be less than about 50 percent of the upper surface area of the motor element. Such a device may have a transverse sectional view identical to that shown in FIG. 5b.

To increase further the amount of stress placed on the memory element of any of the device described above, it is possible to use dual motor elements. Such a structure is shown in FIG. 6, wherein a memory device 50' configured like that of FIGS. 5a and 5b includes a second motor element 56 disposed beneath the motor element 52'. An additional electrode 57 is disposed on the bottom surface of the motor element 56 and is connected to ground via a conductor 58.

In the embodiment of FIG. 6, the interrogate signal is supplied via a line 59 to the electrode 54' between the upper and lower motor electrodes 52' and 56. Of course, the electrostrictive ceramic material of the motor elements 52' and 56 is appropriately poled so that each motor element is stressed in an adding direction upon application of the interrogate signal. An additional motor element of the type shown in FIG. 6 could be employed with any of the other ceramic memories described above.

Referring now to FIG. 7, there is shown one technique for damping a ceramic memory to prevent ringing which otherwise might cause erroneous bit indication. Thus, a ceramic memory 60 includes a memory element 61, one or more bit electrodes 62, a motor element 63 and an interrogate electrode 64. Sandwiched between the members 61 and 63 is a damping electrode 65 preferably fabricated of an alloy which is both electrically conductive and which exhibits a mechanical damping capability.

The damping electrode 65 typically may comprise 55-Nitinol, a combination of nickel and titanium which provides a 25 percent specific damping capacity. (Specific damping capacity is the percentage of vibrational energy absorbed per cycle.) Alternatively, other "Hidamets," metals which combine a high specific damping capacity with electrical conductivity, may be used as the electrode 65. Such materials are described in the article entitled "Hidamets-Metals to Reduce Noise and Vibration" by D. Birchon, published in The Engineer, Aug. 5, 1966, beginning at page 207. Typically, the damping electrode 65 may be between 1 mil and 10 mils thick.

Operation of the ceramic memory 60 is similar to that described in conjunction with FIG. 2 above. However, the damping electrode 65 functions to eliminate any tendency of the memory element 61 to ring or oscillate, which ringing might produce an output signal of reduced amplitude or of polarity opposite that which should be produced in view of the datum stored beneath the bit electrode 62.

Another technique for damping a ceramic memory is illustrated in FIG. 8. Referring thereto, a ceramic memory 67 is mounted to a rigid substrate 68 by means of a layer 69 of energy absorbing, non-metallic synthetic rubber material. Such a "dead rubber" material is manufactured by the Industrial Electronic Rubber Company, and sold commercially as "compound A321–2." The energy absorbing rubber layer 69, which typically may be 20 to 50 mils thick, functions to damp ringing of the ceramic memory 67.

A further technique to eliminate ringing in a ceramic memory is to clamp one or more edges of the memory to a rigid substrate, as shown in FIG. 9. Referring thereto, a ceramic memory 70 is mounted to a rigid substrate 71 by means of an epoxy resin bead 72 extending along only one edge 73 of the device 70. Of course, adhesives other than epoxy resin could be used. Alternatively, a mechanical clamp (not shown) could be employed to clamp one or more edges of the memory to the substrate.

Ceramic memories of the type disclosed herein are particularly well adapted for use in a credit card. Thus there is shown in FIG. 10 a typical plastic credit card 80 imbedded in which is a ceramic memory 81 in accordance with the present invention. A series of planar electrical conductors 82 interconnect the various electrodes 83 of the memory 81 with a set of contacts 84 along one edge of the card 80. The credit card 80 also may include appropriate written or raised information on its outer surface.

The credit card 80 typically is employed in conjunction with a computerized accounting system. For example, the device 81 may store the card holder's current credit status and the dollar amount of credit still available. When a credit purchase is made, the card 80 is inserted in an appropriate electronic equipment (not shown) which reads from the memory 81 the credit available, subtracts the amount of the purchase made, and perhaps re-enters a new credit balance in the card. Of course, use of the inventive ceramic memories is not limited to credit cards; the memories find widespread application in various types of computer and electronic digital equipments.

Intending to claim all novel, useful and unobvious features shown or described; I make the following claims:

1. A two layer ceramic bender memory including:
   a. a motor element mechanically bonded to a memory element having one or more bit electrodes,
   b. the area of said bit electrodes being less than about one-half the area of said motor element,
   c. said bit electrodes being disposed adjacent the center of said memory element so that the data storage regions of said memory element are restricted only to the region receiving maximum stress, and the "sink" effect of the remainder of said memory element is minimized.

2. A ceramic memory according to claim 1 further comprising:
   d. means for mechanically damping said memory element.

3. In a ceramic memory of the type including a motor element of electrostrictive material, a memory element of ferroelectric ceramic material mounted to be stressed by said motor element, the improvement comprising a damping electrode disposed between said motor and memory elements, said electrode comprising an electrically conductive alloy exhibiting significant specific damping capacity.

4. A ceramic memory element as defined in claim 3 wherein said alloy exhibits a specific damping capacity of at least 20 percent.

5. A ceramic memory element as defined in claim 4 wherein a portion of said memory element exhibits an electrostrictive effect and performs a motor function enhancing the stress produced by said motor element.

6. A nondestructive ceramic memory comprising:
   a. a thin, rectangular sheet of electrostrictive material,
   b. a first thin film electrode disposed atop said electrostrictive sheet,
   c. a second thin film electrode disposed beneath said electrostrictive sheet,
   d. a thin sheet of ceramic material mechanically mounted atop said first electrode and adapted to be stressed by said electrostrictive sheet upon application of an electric field between said first and second film electrodes,
   e. a plurality of thin film bit electrodes disposed atop said ceramic sheet only in the regions maximally stressed by said electrostrictive sheet,
   f. the ceramic material beneath each bit electrode being polarizable to one of two ferroelectric domain orientations in response to an electric field of sufficient magnitude applied via that bit electrode, stress of said ceramic sheet producing a voltage at each bit electrode having a polarity indicative of the stored domain orientation beneath that electrode, and
   g. means for mechanically damping said ceramic sheet.

7. A ceramic memory according to claim 6 wherein said means for mechanically damping comprises an energy absorbing synthetic rubber used to mount said ceramic memory to a substrate.

8. A ceramic memory according to claim 6 wherein said means for mechanically damping comprises an epoxy resin bead attaching one edge of said ceramic memory to a rigid substrate.

9. A ceramic memory according to claim 6 wherein said means for mechanically damping comprises a clamp attaching one edge of said ceramic memory to a rigid substrate.

10. A ceramic memory according to claim 6 wherein said means for mechanically damping comprises a mechanical damping alloy utilized as said second electrode.

11. A ceramic memory according to claim 6 wherein said electrostrictive and ceramic sheets are generally rectangular, said bit electrodes being disposed in a row along the centerline of said ceramic sheet, each bit electrode having a width less than about one-half the width of said electrostrictive sheet.

12. A ceramic memory according to claim 11 wherein the width of said ceramic sheet is substantially equal to the width of said electrostrictive sheet, and further comprising a generally U-shaped electrode disposed atop said ceramic sheet between said bit electrodes and the longitudinal edges of said ceramic sheet, the portion of ceramic sheet beneath said U-shaped electrode exhibiting an electrostrictive effect so that application of an electric field between said U-shaped electrode and said first film electrode will cause said portion to deform and enhance the stress produced by said electrostrictive sheet.

13. A ceramic memory comprising:
   a. a first thin sheet of electrostrictive ceramic material, said first sheet electrostrictively functioning as a motor element,
   b. a second thin sheet of ceramic material mechanically bonded to said first sheet, a portion of said second sheet exhibiting a ferroelectric effect and functioning as a memory element,
   c. a first planar electrode sandwiched between said first and second sheets, and a second planar electrode disposed on the bottom surface of said motor element, and
   d. one or more signal bit electrodes disposed atop said memory element adjacent the center thereof, the maximum dimension of each bit electrode being no greater than about one-half the maximum width dimension of said motor element.

14. A ceramic memory according to claim 13 wherein said first and second sheets both are either generally disc shaped or rectangular and both are of approximately equal size.

15. A ceramic memory according to claim 13 wherein said first and second sheets are generally rectangular, the length of said first sheet being at least twice the width of said first sheet, said second sheet having a width less than about one-half the width of said first sheet and being disposed along the centerline of said motor element, a plurality of bit electrodes being disposed in a row atop said second sheet.

16. A ceramic memory according to claim 13 wherein said first and second sheets are circular and wherein said memory element is disposed atop the center of said motor element and has an area less than about 50 percent of the area of said motor element.

17. A credit, identification or security key card comprising:
   a generally planar electrically insulative housing,
   a ceramic memory according to claim 13 incorporated within said housing, and
   conductor means for making electrical connections to said memory.

18. A ceramic memory according to claim 13 further comprising interrogate signal means for applying an interrogate voltage across said first and second planar electrodes, the resultant deformation produced within said motor element being transmitted to cause maximum stress of said memory element in the regions beneath said bit electrodes.

19. A ceramic memory according to claim 18 wherein the regions of said second sheet between said bit electrodes and the outer edge or edges of said second sheet exhibit an electrostrictive effect, and further comprising another electrode disposed atop said electrostrictive regions of said second sheet, said interrogate voltage also being applied between said other electrode and said first planar electrode, the resultant deformation produced in said electrostrictive regions of said second sheet being transmitted to said memory element to enhance the stress produced therein by said motor element.

20. A ceramic memory according to claim 18 further comprising a second electrostrictive motor element disposed beneath said second planar electrode, a third planar electrode beneath said second motor element, and wherein said interrogate voltage also is applied between said second and third planar electrodes.

21. A ceramic memory according to claim 18 and transistor circuit means for receiving the unamplified output signal produced at said bit electrode in response to application of said interrogate voltage.

22. A ceramic memory according to claim 13 further comprising means for mechanically damping said memory element.

23. A ceramic memory according to claim 22 wherein said means for damping comprises an energy absorbing synthetic rubber mounting for said ceramic memory.

24. A ceramic memory according to claim 22 wherein said means for damping comprises means for clamping an edge of said ceramic memory to a rigid substrate.

25. A ceramic memory according to claim 22 wherein said means for damping comprises a Hidamet used as said first electrode.

26. A ceramic memory according to claim 25 wherein said Hidamet comprises an alloy of nickel and titanium.

* * * * *